United States Patent
Suzuki

(10) Patent No.: US 7,677,346 B2
(45) Date of Patent: Mar. 16, 2010

(54) FRAME STRUCTURE OF MOTORCYCLE

(75) Inventor: Masafumi Suzuki, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 15 days.

(21) Appl. No.: 12/049,564

(22) Filed: Mar. 17, 2008

(65) Prior Publication Data

US 2008/0258422 A1     Oct. 23, 2008

(30) Foreign Application Priority Data

Mar. 20, 2007   (JP) .............................. 2007-073156

(51) Int. Cl.
*B62D 61/02* (2006.01)
(52) U.S. Cl. .................... 180/219; 280/274; 280/281.1; 280/288.2
(58) Field of Classification Search .................. 180/219
See application file for complete search history.

(56) References Cited

U.S. PATENT DOCUMENTS

| 4,699,233 | A  | * | 10/1987 | Koga et al. ................... | 180/219 |
| 6,481,522 | B1 | * | 11/2002 | Adachi ........................ | 180/219 |
| 2002/0089197 | A1 | | 7/2002 | Muramatsu | |
| 2003/0071481 | A1 | | 4/2003 | Igarashi et al. | |
| 2003/0122364 | A1 | | 7/2003 | Muramatsu | |
| 2004/0140682 | A1 | | 7/2004 | Ito et al. | |
| 2004/0182634 | A1 | * | 9/2004 | Adachi et al. ................ | 180/312 |
| 2006/0157955 | A1 | * | 7/2006 | Kurokawa et al. .......... | 280/279 |

FOREIGN PATENT DOCUMENTS

JP           2001-10578           1/2001

OTHER PUBLICATIONS

English language Abstract of JP 2001-10578.

* cited by examiner

*Primary Examiner*—Lesley Morris
*Assistant Examiner*—Tashiana Adams
(74) *Attorney, Agent, or Firm*—Stein McEwen, LLP

(57) ABSTRACT

A head pipe is disposed in a front side of a vehicle frame. Left and right main pipes extend from the head pipe toward a rear side of the vehicle frame. The Left and right main pipes are welded to the head pipe. A down tube extends from the head pipe toward the rear side and welded to the head pipe. The head pipe includes: a head pipe main body supporting a steering shaft; a main pipe connection portion disposed in a rear upper portion of the head pipe, the main pipe connection portion to which a front ends of the left and right main pipes are welded; and a down tube connection portion disposed in a rear lower portion of the head pipe. The head pipe main body, the main pipe connection portion and the down tube connection portion are integrally formed with one another by a casting or a forging. The down tube connection portion includes: an extension connection portion extending from the head pipe main body in a extending direction of the down tube; and a welding connection portion formed at a rear end portion of the extension connection portion, the welding connection portion to which a front end of the down tube is welded.

4 Claims, 7 Drawing Sheets

FRAME STRUCTURE OF MOTORCYCLE

The disclosure of Japanese Patent Application No. 2007-073156 filed on Mar. 20, 2007 including specification, drawings and claims is incorporated herein by reference in its entirety.

BACKGROUND

The present invention relates to a frame structure of a motorcycle, and more particularly, to a frame structure in which a head pipe disposed in the front side of a vehicle frame, and left and right main pipes, and a down tube are connected to one another by a welding.

In general, a motorcycle includes a vehicle frame for configuring a frame thereof. A head pipe is provided in the front side of the vehicle frame so as to axially support a steering shaft and a front fork at the upper and lower ends thereof, respectively. Then, the rear portion of the head pipe is connected by a welding to a pair of left and right main pipes and a down tube formed as a single body to thereby configure a frame structure of the motorcycle.

As a related-art frame structure, for instance, as shown in FIG. 8, a main pipe 6 is welded to a cylindrical portion 2 of a head pipe 1 which is forged by separate left and right molds, upper and lower flange portions 3 and 4 which extend from the cylindrical portion 2 to the rear side, a longitudinal flange portion 5 which is connected to the rear portions of the upper and lower flange portions 3 and 4, and a down tube 9 is welded to the lower surface of the lower flange portion 4, tongue pieces 7 and 8 which are disposed below the lower flange portion 4 and which extend from the cylindrical portion 2 to the rear side in a downward inclined direction (for instance, see Patent Document 1).

Patent Document 1: Japanese Patent Publication No. 2001-10578A

However, since the related-art frame structure has a configuration in which a front wheel is axially supported by the lower end of the front fork, a pushing-up load applied from a road surface is transmitted to the head pipe through the front fork. In particular, stress is concentrated on a portion in which the lower portion of the head pipe 1 is connected to the down tube 9. Additionally, since the down tube 9 is configured by a pipe, it is not possible to partly improve strength. As a result, since it is necessary to increase a thickness of a plate or a thickness of the down tube 9 as a whole in order to configure a frame structure which endures the pushing-up load applied from the road surface, a problem arises in that it is difficult to reduce a weight of the frame structure.

SUMMARY

It is therefore an object of the invention to provide a light frame structure of a motorcycle capable of ensuring sufficient connection strength.

In order to achieve the above objects, according to an aspect of the invention, there is provided a frame structure of a motorcycle comprising: a head pipe disposed in a front side of a vehicle frame; left and right main pipes extending from the head pipe toward a rear side of the vehicle frame and welded to the head pipe; and a down tube extending from the head pipe toward the rear side and welded to the head pipe; wherein the head pipe includes: a head pipe main body supporting a steering shaft; a main pipe connection portion disposed in a rear upper portion of the head pipe, the main pipe connection portion to which a front ends of the left and right main pipes are welded; and a down tube connection portion disposed in a rear lower portion of the head pipe; wherein the head pipe main body, the main pipe connection portion and the down tube connection portion are integrally formed with one another by a casting or a forging; and wherein the down tube connection portion includes: an extension connection portion extending from the head pipe main body in a extending direction of the down tube; and a welding connection portion formed at a rear end portion of the extension connection portion, the welding connection portion to which a front end of the down tube is welded.

The extension connection portion may include: a solid portion which is formed in a position close to the head pipe main body; and a down tube supporting portion which extends from the solid portion in the extending direction of the down tube so as to support the down tube; a dimension of the down tube supporting portion in a vehicle width direction may be substantially the same as that of the head pipe; and the solid portion may be formed with concave portions so that a dimension of the solid portion in the vehicle width direction is smaller than that of the down tube supporting portion.

The concave portions of the solid portion may be horizontally symmetric with each other with respect to a vehicle center. The down tube supporting portion may have a U-shaped cross section opened toward the rear side of the vehicle frame. A thickness of a front-side portion of the head pipe may be smaller than that of the other portion of the head pipe.

According to the aspect of the invention, since the welding connection portion is formed in the rear end of the extension connection portion and the welding connection portion is away from the head pipe main body, the extension connection portion absorbs most of a pushing-up load applied from a road surface during a driving and thus stress can be prevented from being concentrated on the welding connection portion. Accordingly, it is possible to improve strength of the whole frame structure and to improve a degree of freedom of the shape of the lower portion of the head pipe.

Further, since the concave portions are formed in the solid portion of the extension connection portion, it is possible to reduce the weight thereof and to appropriately balance the strength thereof. Also, it is possible to improve the steering stability. In addition, since the volume reduced by the concave portions is used for the welding connection portion or the down tube supporting portion during a forging, it is possible to prevent the productivity from deteriorating and to prevent the cost from increasing.

Furthermore, since the size or the depth of the concave portions is adjusted, it is possible to easily adjust the torsion strength and to minutely change the steering stability. Moreover, it is possible to improve a degree of freedom of a design.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, an embodiment of the invention will be described with reference to the accompanying drawings.

Figure 1:
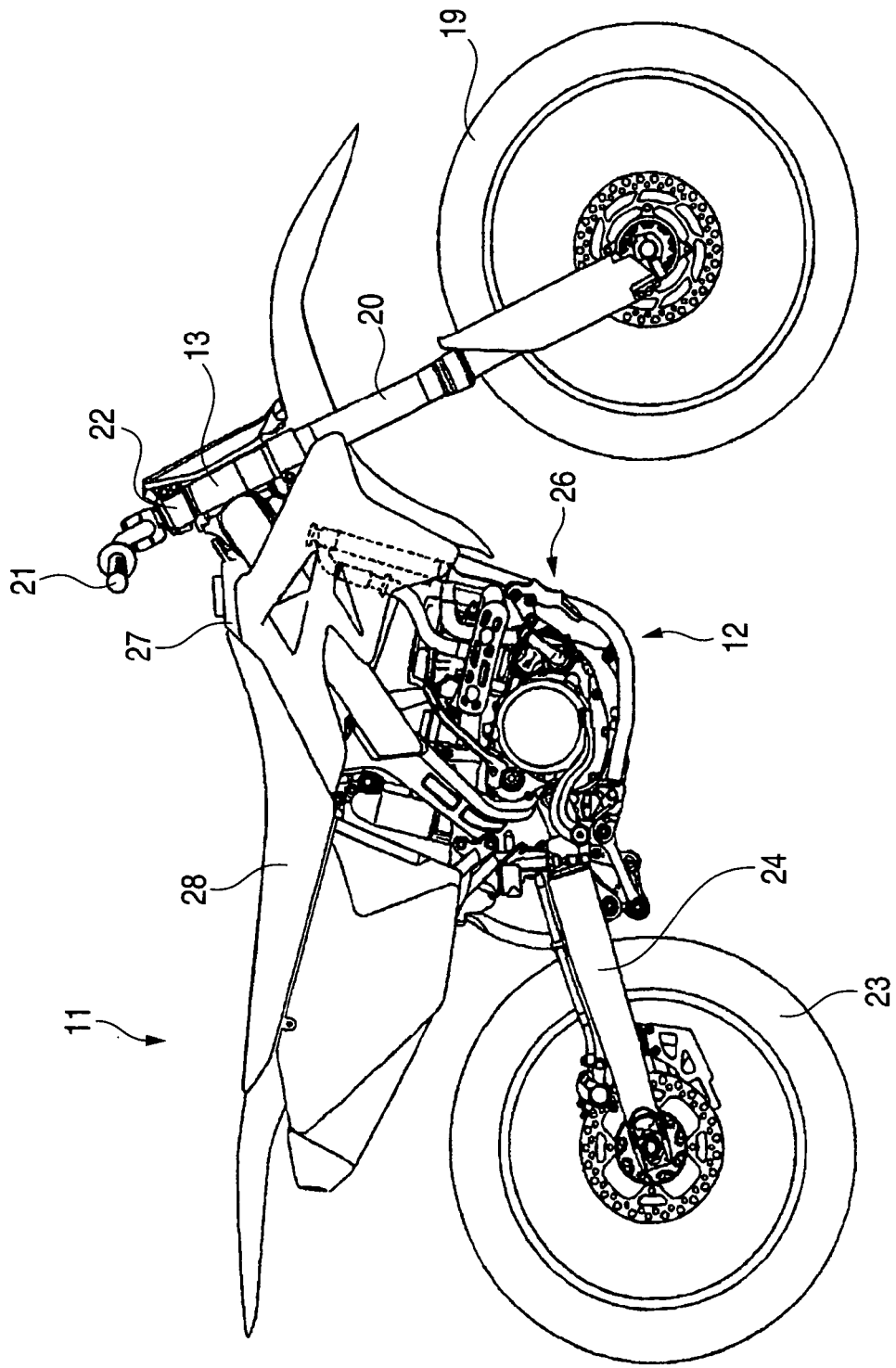
FIG. 1 is a right side view showing a motorcycle with a frame structure according to an embodiment of the invention.

First, a frame structure and a motorcycle provided with the frame structure according to the embodiment of the invention will be described with reference to FIG. 1.

A motorcycle 11 includes a vehicle frame 12 which configures a frame. Then, the vehicle frame 12 includes a head pipe 13 which is disposed in the front side, left and right main pipes 14 which extend from the head pipe 13 to the rear side, a down tube 15 which is formed as a single body, the single body being formed of a hollow pipe with a rectangular cross section extending from the head pipe 13 to the rear side in a downward inclined direction; a pair of left and right lower tubes 17 of which the front ends are connected to the lower end of the down tube 15 through a joint member 16 so as to be branched left and right and to extend to the rear side; and pivot frames 18 of which each of the upper ends is connected to each of the rear ends of the main pipes 14 and each of the lower ends is connected to each of the rear ends of the lower tubes 17.

In the head pipe 13, a front fork 20 is rotatably provided in the lower end thereof so as to axially support a front wheel 19 and a steering shaft 22 including a handlebar 21 is rotatably fitted to the upper end thereof. Accordingly, the front wheel 19 is configured to turn left or right by the steering operation of the handlebar 21.

A swing arm 24 for supporting a rear wheel 23 is axially supported by a pivot shaft (not shown) disposed between the left and right pivot frames 18 so as to be vertically movable.

An engine 26 is mounted to a frame space 25 surrounded by the pivot frame 18, the lower tube 17, and the down tube 15, and the main pipe 14 of the vehicle frame 12. At this time, power generated from the engine 26 is transmitted to the rear wheel 23 through a drive sprocket, a chain, and a driven sprocket (not shown).

In addition, a fuel tank 27 is installed in the upper portion of the engine 26 (main pipe 14) and a rider seat 28 is disposed on a seat rail so as to be attachable thereto or detachable therefrom.

Next, the frame structure of the motorcycle according to the embodiment of the invention will be described with reference to FIGS. 3 to 7.

Figure 3:
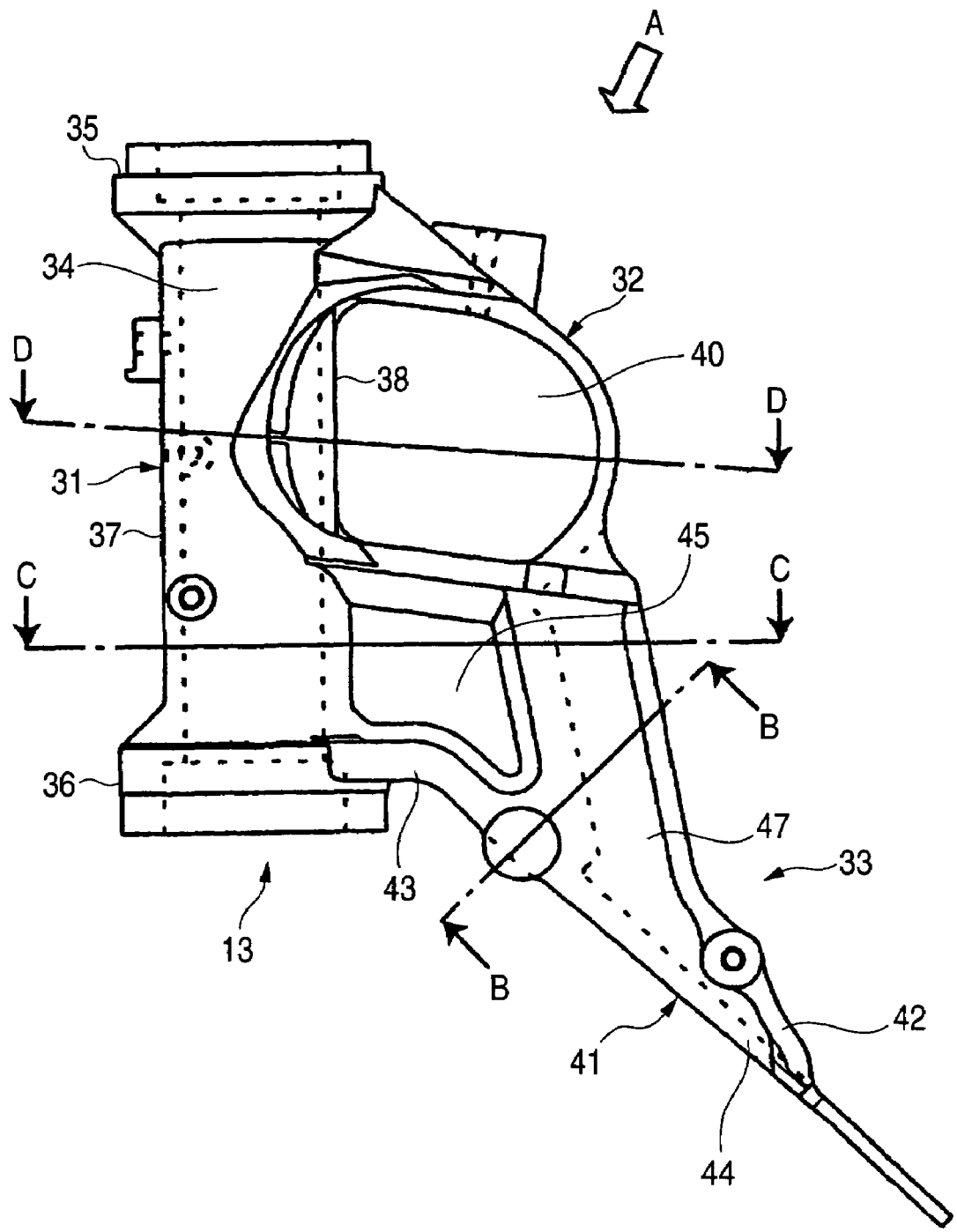
FIG. 3 is a side view showing the frame structure of the motorcycle according to the embodiment.

As shown in FIG. 3, in terms of a casting or a forging, the head pipe 13 is integrally formed with a head pipe main body 31 which supports the steering shaft 22, a main pipe connection portion 32 in which the rear upper portion of the head pipe main body 31 is welded to the front ends of the left and right main pipes 14, and a down tube connection portion 33 in which the rear lower portion of the head pipe main body 31 is welded to the front end of the down tube 15.

Figure 7:
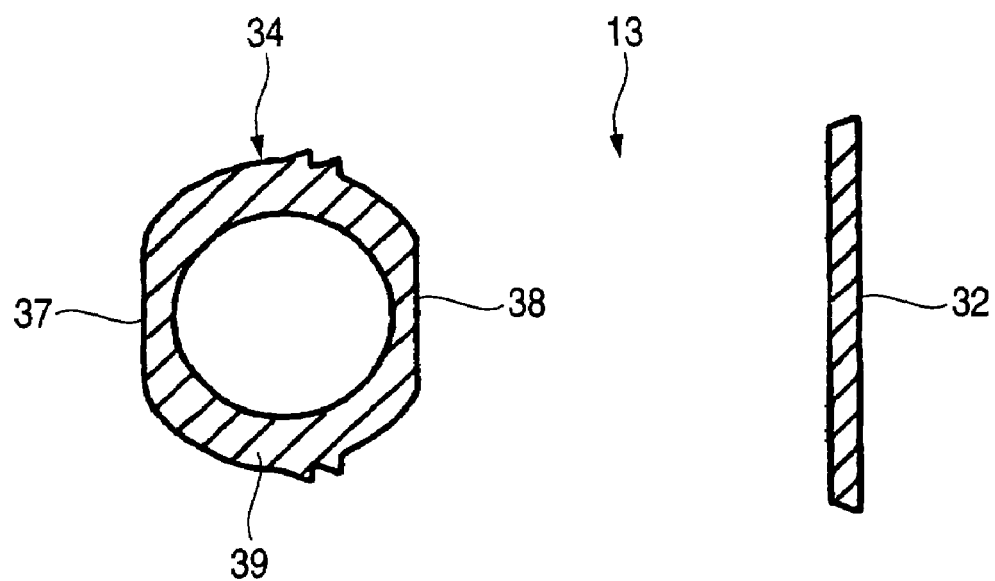
FIG. 7 is a sectional view taken along the line D-D shown in FIG. 3.
Figure 8:
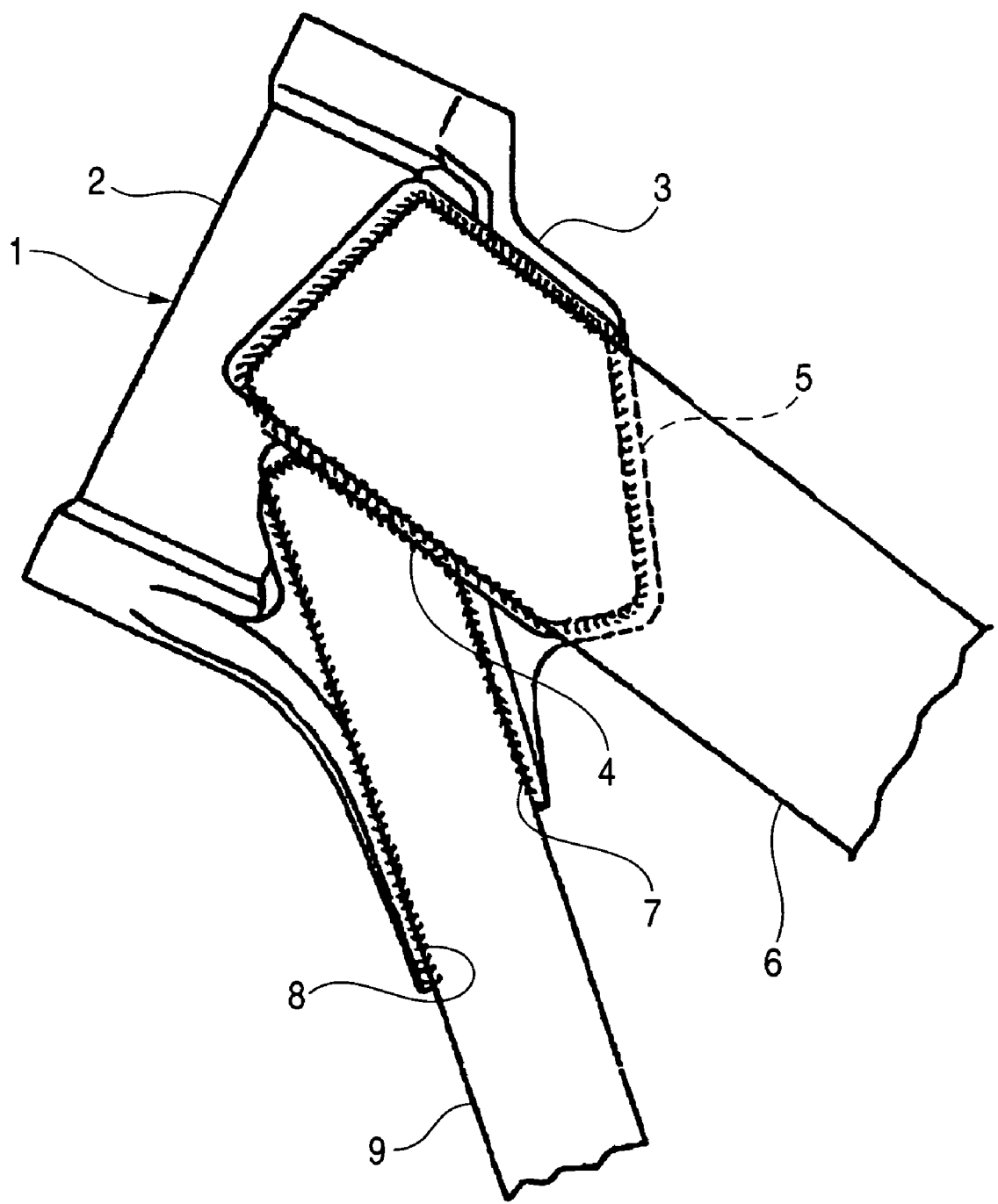
FIG. 8 is a side view showing a frame structure of a related-art motorcycle.

The head pipe main body 31 includes a cylindrical pipe 34 and upper and lower bearing holding portions 35 and 36 which are disposed in the upper and lower ends of the cylindrical pipe 34 so as to hold a steering bearing. Then, as shown in FIG. 7, a front-side portion 37 and a rear-side upper portion 38 of the cylindrical pipe 34 to which large stress is not applied in the direction in which the vehicle advances is smaller in thickness than that of a portion 39 having a different thickness, and the outer surfaces thereof are formed in a flat shape. Accordingly, it is possible to reduce the weight of the frame structure and to use the outer surface of the cylindrical pipe 34 as a space where an electronic controller and the like are attached.

In addition, a through-hole 40 is formed in the main pipe connection portion 32 in the vehicle width direction and the front ends of the left and right main pipes 13 are configured to be fitted to the main pipe connection portion 32 through the through-hole 40 in the left and right directions. Then, the front ends of the main pipes 14 are connected to the main pipe connection portion 32 in such a manner that portions around the left and right ends of the main pipe connection portion 32 are fillet welded in the state where the front ends of the left and right main pipes 14 are fitted to the through-hole 40.

The down tube connection portion 33 includes an extension connection portion 41 which extends from the head pipe main body 31 in the direction in which the down tube 15 extends and a welding connection portion 42 in which the rear end of the extension connection portion 41 is welded to the front end of the down tube 15.

The extension connection portion 41 includes a solid portion 43 which is formed in a position close to the head pipe main body 31 and a down tube supporting portion 44 which extends from the solid portion 43 in the direction in which the down tube 15 extends.

Figure 6:
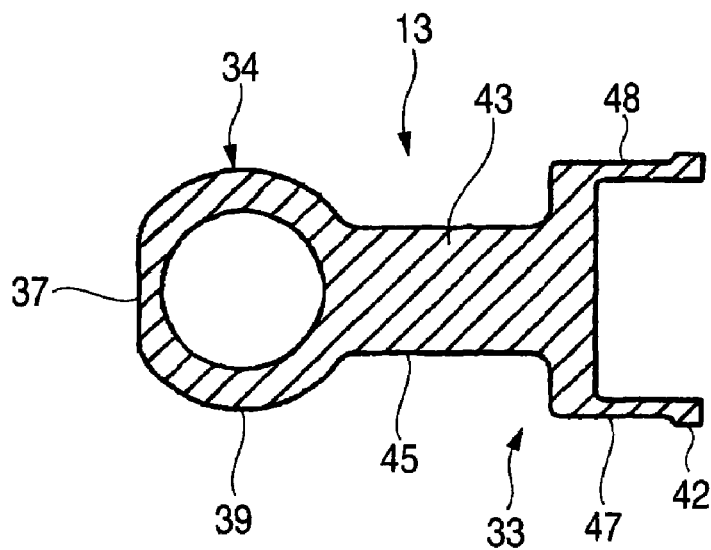
FIG. 6 is a sectional view taken along the line C-C shown in FIG. 3.

As shown in FIG. 6, concave portions 45 are formed in the solid portion 43 so that each dimension is smaller than that of the down tube supporting portion 44 in the vehicle width direction and the concave portions 45 are formed therein so as to be symmetric with each other with respect to the vehicle center in the left and right directions.

Figure 5:
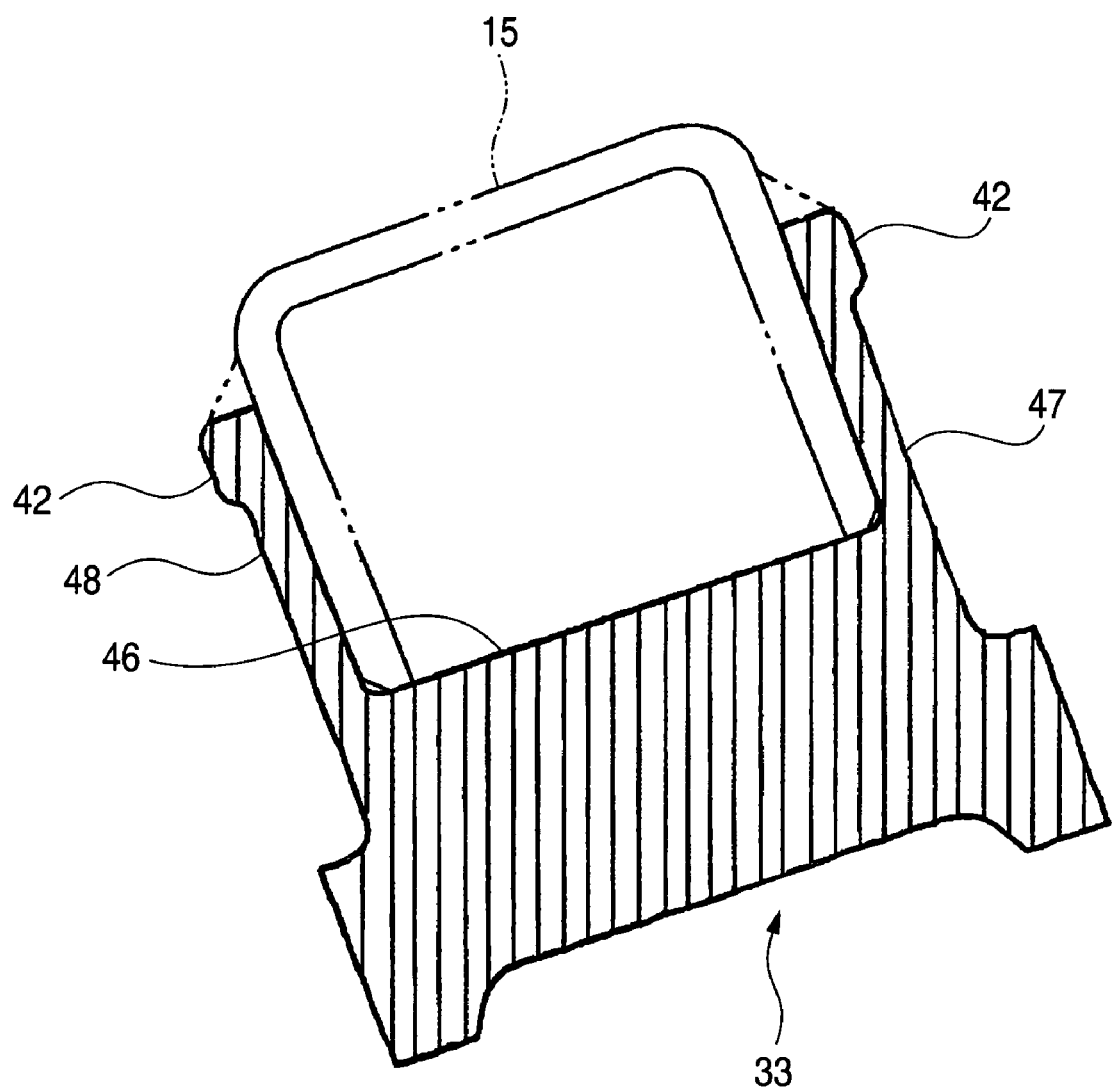
FIG. 5 is a sectional view taken along the line B-B shown in FIG. 3.

As shown in FIG. 5, the down tube 44 has a U-shaped cross section opened to the rear side in the direction in which the vehicle advances, the U-shaped cross section being formed by a lower surface supporting portion 46 which supports the lower surface of the down tube 15, and a left surface supporting portion 47 and a right surface supporting portion 48 which are respectively formed between the main pipe connection portion 32 and both left and right frame portions of the lower surface supporting portion 46. Accordingly, since the down tube supporting portion 44 can support the front end of the down tube 15 while surrounding the outer periphery of the front end, it is possible to improve connection strength between the down tube supporting portion 44 and the down tube 15.

Figure 2:
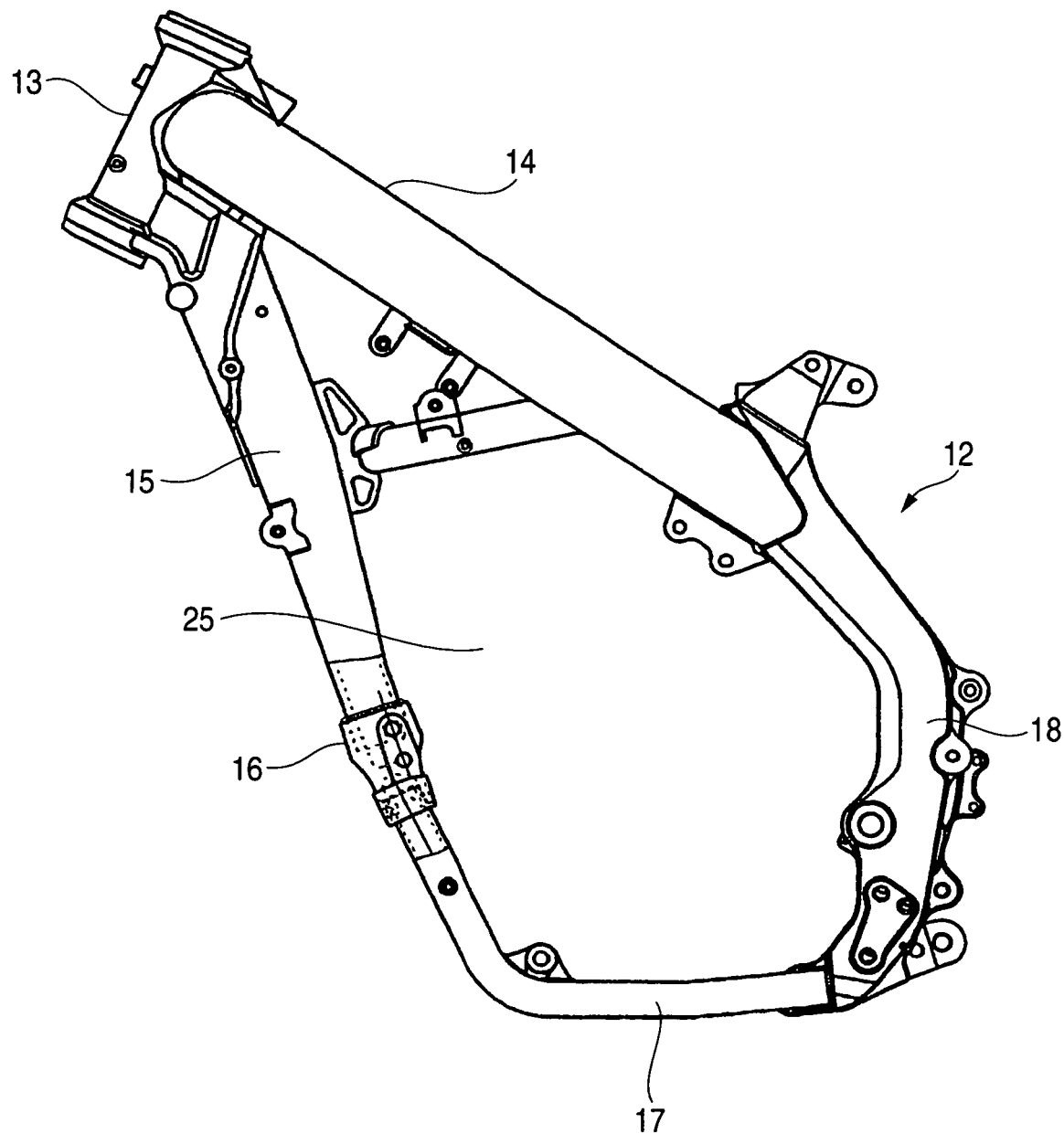
FIG. 2 is a left side view showing a vehicle frame of the motorcycle with the frame structure according to the embodiment.
Figure 4:
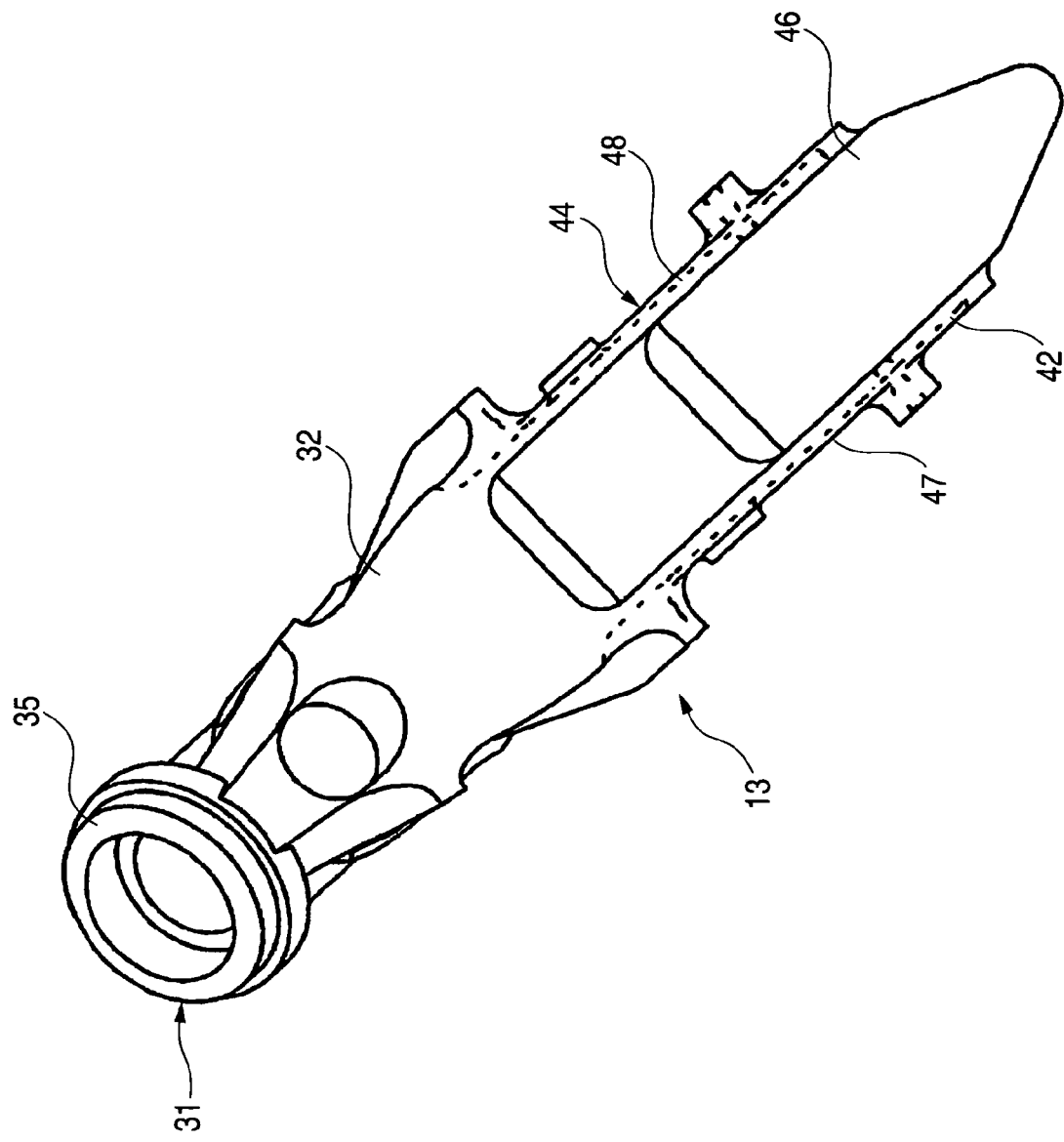
FIG. 4 is a view showing the frame structure when viewed from the arrow A shown in FIG. 3.

The welding connection portion 42 is formed in the rear ends of the left surface supporting portion 47, the right surface supporting portion 48, and the lower surface supporting portion 46. As shown in FIG. 4, the rear end of the lower surface supporting portion 46 is formed in a shape in which the end becomes narrow. Additionally, as shown in FIGS. 2 and 3, the rear ends of the left surface supporting portion 47 and the right surface supporting portion 48 are formed in an inclined shape. Accordingly, since the welding length of the welding connection portion 42 is long, it is possible to improve connection strength of the welding position.

In addition, the down tube supporting portion 44 is formed by a mechanical working after forming the solid portion 43 of the down tube connection portion 33, the main pipe connection portion 32, and the head pipe main body 31 into a single body by a casting or a forging. Subsequently, the whole circumference of the welding connection portion 42 formed in the rear end of the down tube supporting portion 44 is fillet welded, and thus the front end of the down tube 15 is connected to the down tube supporting portion 44.

In the frame structure of the motorcycle according to the embodiment described above, the extension connection portion 41 is formed between the head pipe main body 31 and the welding connection portion 42. At this time, since the extension connection portion 41 absorbs most of a pushing-up load applied from a road surface during a driving and thus stress can be prevented from being concentrated on the welding connection portion 42, it is possible to improve strength of the whole frame structure. Additionally, since the extension connection portion 41 is provided, it is possible to improve a degree of freedom of a shape of the lower portion of the head pipe 13. Accordingly, it is possible to provide the light frame structure having high strength without increasing strength of unnecessary portions.

Further, since the concave portions 45 are formed in the solid portion 43 of the extension connection portion 41, it is possible to reduce the weight thereof and to appropriately balance the strength thereof. Also, it is possible to improve the steering stability. In addition, since the volume reduced by the concave portions 45 is used for the welding connection portion 42 or the down tube supporting portion 44 during a forging, it is possible to prevent the productivity from deteriorating and to prevent the cost from increasing. Since the size or depth of the concave portions 45 is adjusted, it is possible to easily adjust the torsion strength and to minutely change the steering stability. Moreover, it is possible to improve a degree of freedom of a design.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A frame structure of a motorcycle comprising:
    a head pipe disposed in a front side of a vehicle frame;
    left and right main pipes extending from the head pipe toward a rear side of the vehicle frame and welded to the head pipe; and
    a down tube extending from the head pipe toward the rear side and welded to the head pipe;
    wherein the head pipe includes:
        a head pipe main body supporting a steering shaft;
        a main pipe connection portion disposed in a rear upper portion of the head pipe, the main pipe connection portion to which a front ends of the left and right main pipes are welded; and
        a down tube connection portion disposed in a rear lower portion of the head pipe;
    wherein the head pipe main body, the main pipe connection portion and the down tube connection portion are integrally formed with one another by a casting or a forging;
    wherein the down tube connection portion includes:
        an extension connection portion extending from the head pipe main body in a extending direction of the down tube; and
        a welding connection portion formed at a rear end portion of the extension connection portion, the welding connection portion to which a front end of the down tube is welded;
    wherein the extension connection portion includes:
        a solid portion which is formed in a position close to the head pipe main body; and
        a down tube supporting portion which extends from the solid portion in the extending direction of the down tube so as to support the down tube;
    wherein a dimension of the down tube supporting portion in a vehicle width direction is substantially the same as that of the head pipe; and
    wherein the solid portion is formed with concave portions so that a dimension of the solid portion in the vehicle width direction is smaller than that of the down tube supporting portion.

2. The frame structure as set forth in claim 1, wherein the concave portions of the solid portion are horizontally symmetric with each other with respect to a vehicle center.

3. The frame structure as set forth in claim 1, wherein the down tube supporting portion has a U-shaped cross section opened toward the rear side of the vehicle frame.

4. A frame structure of a motorcycle comprising:
    a head pipe disposed in a front side of a vehicle frame;
    left and right main pipes extending from the head pipe toward a rear side of the vehicle frame and welded to the head pipe; and
    a down tube extending from the head pipe toward the rear side and welded to the head pipe;
    wherein the head pipe includes:
        a head pipe main body supporting a steering shaft;
        a main pipe connection portion disposed in a rear upper portion of the head pipe, the main pipe connection portion to which a front ends of the left and right main pipes are welded; and
        a down tube connection portion disposed in a rear lower portion of the head pipe;
    wherein the head pipe main body, the main pipe connection portion and the down tube connection portion are integrally formed with one another by a casting or a forging;
    wherein the down tube connection portion includes:
        an extension connection portion extending from the head pipe main body in a extending direction of the down tube; and
        a welding connection portion formed at a rear end portion of the extension connection portion, the welding connection portion to which a front end of the down tube is welded; and
    wherein a thickness of a front-side portion of the head pipe is smaller than that of the other portion of the head pipe.

* * * * *